(12) United States Patent
Stoschek

(10) Patent No.: US 6,580,831 B1
(45) Date of Patent: Jun. 17, 2003

(54) COMPRESSION OF OPTICAL READOUT BIOMOLECULAR SENSORY DATA

(75) Inventor: Arne Stoschek, Palo Alto, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/050,055

(22) Filed: Jan. 14, 2002

(51) Int. Cl.[7] .................................................. G06K 9/36
(52) U.S. Cl. ........................ 382/240; 382/275; 382/250
(58) Field of Search ................................ 382/250, 275, 382/41, 251, 240, 260

(56) References Cited

U.S. PATENT DOCUMENTS

| | | | | |
|---|---|---|---|---|
| 4,447,886 A | * | 5/1984 | Meeker | 364/725 |
| 4,751,742 A | * | 6/1988 | Meeker | 382/41 |
| 6,353,686 B1 | * | 3/2002 | Daly et al. | 382/251 |

OTHER PUBLICATIONS

Stephane G. Mallat, "A Theory for Multiresolution Signal Decomposition: The Wavelet Representation," *IEEE Transactions On Pattern Analysis and Machine Intelligence*, vol. 11, No. 7, pp. 674–693, Jul. 1989.

Rebecka Jörnsten and Bin Yu, "'Comprestimation': Microarray Images in Abundance", *2000 Conference on Information Science and Systems, Princeton University*, pp. 1–6, Mar. 15–17, 2000.

J.-L. Starck, F. Murtagh, and M. Louys, "Astronomical Image Compression Using the Pyramidal Median Transform", *Astronomical Data Analysis Software and Systems IV, ASP Conference Series*, vol. 77, pp. 1–4, 1995.

* cited by examiner

*Primary Examiner*—Brian Young
*Assistant Examiner*—John Nguyen
(74) *Attorney, Agent, or Firm*—Jackson Walker L.L.P.

(57) ABSTRACT

The present invention provides a system and method for compression of image data while preserving the usable information and eliminating or reducing associated noise in which the image data includes a signal and noise. The image data is transformed using a multiscale transform technique (such as the Pyramidal Median Transform) such that the image data is represented as a plurality of transform coefficients each having a corresponding weight. From the respective weights, those transform coefficients associated with noise are determined and extracted from the original plurality of transform coefficients. The remaining transform coefficients are subsequently quantized and coded.

14 Claims, 1 Drawing Sheet

COMPRESSION OF OPTICAL READOUT BIOMOLECULAR SENSORY DATA

FIELD OF THE INVENTION

The invention relates generally to micro sensors and, more particularly, to micro sensor signal data processing.

BACKGROUND OF THE INVENTION

Micro sensors and, more particularly, biosensors have attracted much attention lately due to their increasing utility in the pharmaceutical, chemical and biological arenas. Biosensors have been developed to detect a variety of biomolecular complexes including oligonucleotide pairs, antibody-antigen, hormone-receptor, enzyme-substrate and lectin-glycoprotein interactions and protein interactions, for example. In general, biosensors are comprised of two components: a molecular recognition element and a transducing structure that converts the molecular recognition event into a quantifiable signal. Signal transductions are generally accomplished with electrochemical, field-effect transistor, optical absorption, fluorescence or interferometric devices.

Generally, an array of biosensors is used for the execution of biomedical and biomolecular measurements in which the state of the biological system is translated into a response at a specific sensor location. Biomolecular sensor arrays are comprised of individual sensors cells organized in some fashion, such as on a rectangular grid. The output of the biomolecular sensor array is multidimensional data in which each sensor cell (i.e. each data point in the array) codes the response of a specific experiment.

An Optical Readout Biomolecular Sensor (ORBS) array is an example of a specific type of biomolecular sensor. With an ORBS, the state of the biological system is translated into an optical response at a specific sensor location. Protein microarrays are an example for ORBS's. The data at the output of the ORBS are multidimensional data similar to image data, containing a defined spatial sequence of blots with values that differ from the image background (see FIG. 1). The blots code the system response using intensity and color. The geometry in the spatial arrangement of the blots correspond to the experimental condition, i.e. blots can be assigned to an event to be measured. The number of blots, i.e., of events to be measured can be large, e.g. 10000.

The resulting data are usually stored as image data, i.e. as multidimensional pixel arrays with a sufficient resolution, e.g. 24 bpp (bits per pixel). An example size for such an pixel array is. 64 MB. The massive application of ORBS's generates large amounts of data that are difficult to store and distribute. In an effort to coupe with this problem, data compression is used to considerably reduce the number of bits to be stored or transferred while retaining the information content in the data. Data compression is an important consideration for efficient storage of ORBS's data and for transfer of such data over the internet and/or wireless applications, for example.

Currently, there exists no compression standard for this type of data. In "'Comprestimation': Microarray Images in Abundance", by Rebecks Jornsten and Bin Yu, 2000 Conference on Information Sciences and Systems, Princeton University, Mar. 15–17, 2000, which is hereby incorporated by reference, there is described a proposal for "compression" schemes for data from a subclass of ORBS, namely cDNA microarrays, based on (1) predictive coding in real-space and (2) transform-coding using Mallat's orthogonal critically-sampled separable wavelets. Mallat's orthogonal critically-sampled separable wavelets is described in "A Theory for Multiresolution Signal Decomposition: The Wavelet Representation", by Stephane G. Mallat, IEEE Transaction on Pattern Analysis and Machine Intelligence, Volume 11, Number 7, pages 674–693, July 1989. The aforementioned "compression" schemes for cDNA microarrays are insufficient for considerably reducing the number of bits to be stored or transferred while retaining the information content of the data in real environments (which generally exhibit noisy data signals) and generally produce directional compression artifacts due to the directional anisotropy in this signal transform.

Application of off-the-shelf image compression methods, such as "jpeg", "tif" or "Lempel-Ziv" have also been proposed. Application of image signal-transform-based compression methods, such as "jpeg" or "tif", results in poor compression rates (generally less than 5) and/or loss of information in the data since such compression methods are optimized for visual reproducibility of natural images rather than for numerical reproducibility of data features. Textual compression methods, such as "Lempel-Ziv", do not suffice because of associated low compression factors due to the non-textual nature of ORBS data.

SUMMARY OF THE INVENTION

The present invention achieves technical advantages as a system and method for compression of image data from an Optical Readout Biomolecular Sensor array while preserving the usable information and eliminating or reducing associated noise in which the image data includes a signal and noise. The image data is transformed using a multiscale transform technique (such as the Pyramidal Median Transform) such that the image data is represented as a plurality of transform coefficients each having a corresponding weight. The respective weights are used to determine those transform coefficients associated with noise. The transform coefficients determined to be associated with noise are extracted from the original plurality of transform coefficients. The remaining transform coefficients are subsequently quantized and coded.

DETAILED DESCRIPTION

Figure 1:
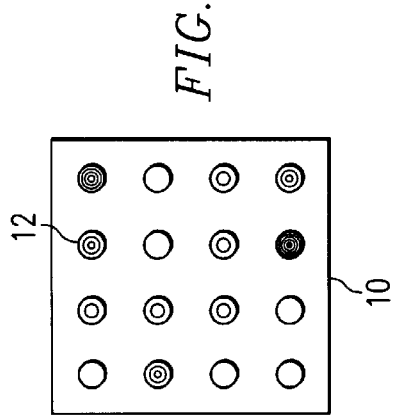
FIG. 1 illustrates an image representation of a two dimensional data set in which the grayscale values for each blot represent an individual sensor response.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Referring now to FIG. 1 there is illustrated a simplified diagram of an exemplary optical readout biomolecular sensor (ORBS) array 10 with a 4-by-4 sensor arrangement which shows an image representation of a two dimensional data set in which the grayscale values for each blot 12 represent an individual sensor response. The blots 12 code the system response using intensity and color. An ORBS array 10 can comprise of up to several thousand individual sensors that are generally organized on a support grid in some non-random and defined fashion, such as the rectangular grid arrangement shown in FIG. 1 (only 16 sensor cells are shown for simplicity). The measured value at each sensor is intended to be representative of a certain state of a biological system under scrutiny.

Large-scale application of ORBS data results in huge amounts of data to be transferred and stored, thus, data compression schemes must be developed for this type of data to considerably reduce the number of bits to be stored or transferred on a communication link while retaining the information content in the data. This is particularly important for wireless and internet based transfer of such data. ORBS data have a certain expected accuracy according to the accuracy of the individual sensors in the array. The digitized ORBS data have a sampling rate well in excess of the resolution needed to meet this expected accuracy. An embodiment of the present invention realizes substantial compression factors (such as 30 . . . 50) while retaining information in the data up to the accuracy of the sensor, thus, enabling efficient storage and distribution of ORBS data.

Recorded ORBS data is comprised of a true signal corresponding to the response of the biological system at a given sensor location as well as of noise, such as resulting from measurement artifacts outside the sensor locations. A core idea of the lossy compression method of the present invention is to reduce or eliminate the noise and to determine a sparse representation for the remainder of the signal. It is considered lossy compression since it is not possible to reproduce 100% of the input data from the output data after compression. Instead, only the relevant part of the input data (i.e. signal) is kept, whereas the non-relevant part of the input data (i.e. noise) is discarded.

Figure 2:
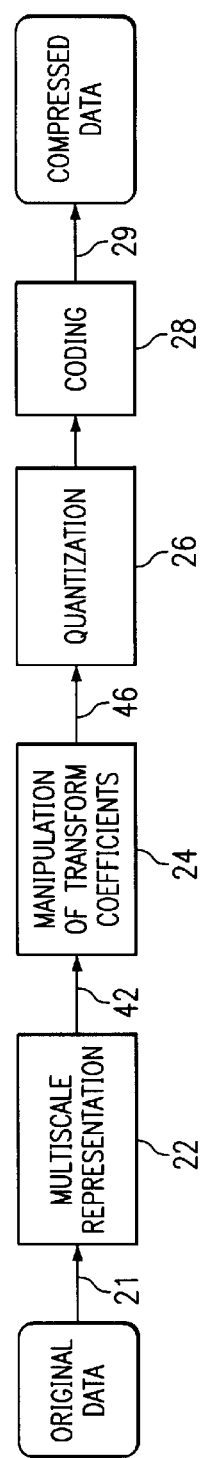
FIG. 2 shows a block diagram of a compressor illustrating compression of ORBS data in accordance with an exemplary embodiment of the present invention.

Referring now to FIG. 2 there is illustrated a block diagram of a compressor for ORBS data compression in accordance with an exemplary embodiment of the present invention. The original ORBS data is received at an input 21 of a multiscale signal transformer 22 adapted to provide a representation of the original data in the transform space of a Pyramidal Median Transform or other similar isotropic multidimensional multiscale transform. Generally, signal transforms provide a mathematical representation of an input signal as transform coefficients in the transform domain. As used here, the multiscale transform (i.e. Pyramidal Median Transform) used in the multiscale signal transformer 22 has the additional advantageous property of efficiently representing the original signal such that it can be reconstructed from a number of selected transform coefficients where this number is small against the sampling points of the original (discrete) ORBS signal. In this case, most of the energy in the original signal is represented (or "concentrated") by a few "high-energy" transform coefficients (i.e. coefficients with large weights) while the remaining number of transform coefficients represent a negligible amount of energy from the original signal. In accordance with the present invention, only a small number of transform coefficients are kept, namely those selected transform coefficients that enable near-perfect reconstruction of the original signal.

Furthermore, the multiscale transform used in the multiscale signal transformer 22 represents noise, such as stochastic noise, in a very different way than the signal, namely by a large number of transform coefficients with small weights relative to the weights of the transform coefficients representative of the original signal. Unlike the signal energy, the energy in the noise is not concentrated in the transform domain, but rather is evenly distributed in the transform domain. This property is used, by a determining unit 24, to distinguish noise from signal by comparing the weights of the transform coefficients and discarding coefficients not associated with signal (i.e. small weight coefficients). Similarly, non-stochastic noise can be distinguished from signal in the ORBS data set that contains signal and noise by also examining characteristic properties of the corresponding transform coefficients. For example, large-scale background distortions (i.e. non-stochastic noise) can be distinguished from signal via scaling properties of the multiscale transform representation, i.e. the distortions are represented by coefficients with weights larger scale than that of the signal.

Figure 4:
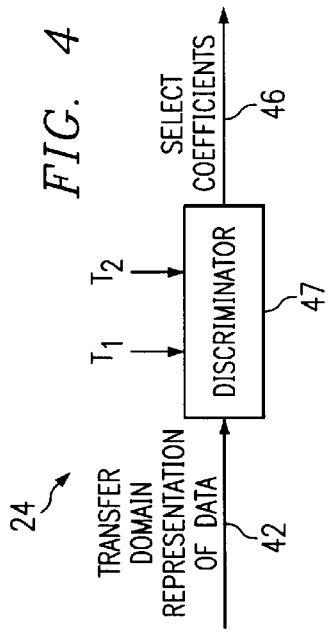
FIG. 4. illustrates an exemplary embodiment of the determining unit 24 shown in FIG. 2.

FIG. 4 further illustrates the determining unit 24 in accordance with an exemplary embodiment of the present invention. An ORBS data set that contains signal and noise and has been transformed into the transform domain representation is input at 42 to a weight discriminator 47. The discriminator 47 is adapted to analyze the relative weights assigned to the respective transform coefficients for a determination of those transform coefficients that correspond to noise. The discriminator 47 discards those transform coefficients that correspond to noise.

For example, coefficients that have weights that are below a first predetermined threshold T1 (i.e. stochastic noise) and/or above a second predetermined threshold T2 (i.e. non-stochastic noise) are discarded. The remaining or select transform coefficients are output at 46 and are received by the quantizing unit 26 for applying quantization using any appropriate conventional quantization technique. Subsequently, the quantized transform coefficients are sent to the coding unit 28 for coding (generally into a binary representation or other conventional coding scheme). The compressed data output at output 29 can be stored, in memory for example, transmitted, etc. An exemplary mathematical operation to manipulate the transform coefficients at 24 can be based on a common threshold operator, such as $y=x$ for $abs(x)$ greater than or equal to a and otherwise $y=0$ (where x is the input of the threshold operator, y is the output of the threshold operator, a is the threshold parameter, and $abs(x)$ is the absolute value of x). The threshold parameter can be derived from test calculation using synthetic and/or experimental data where signal and noise properties as well as compression parameters are known.

Figure 3:
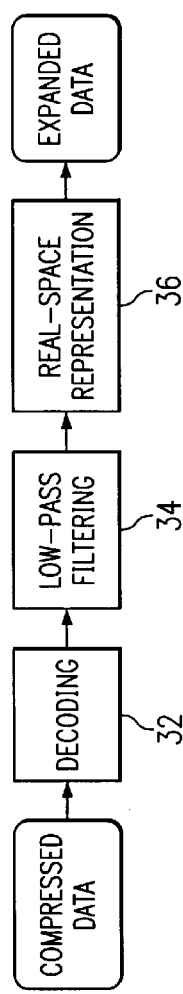
FIG. 3 shows a block diagram of an expander illustrating expansion of compressed ORBS data in accordance with an exemplary embodiment of the present invention.

FIG. 3 illustrates a block diagram for an expander for expanding data compressed as above-described. The compressed data are received by a decoding unit 32 for conventional decoding and the decoded data is received at a low-pass filter 34 for conventional filtering to revert the binary representation of the compressed data into a quasi-continuous representation. Subsequently, the obtained values (resembling the original data without noise components in the transform domain) are transformed, at transformer 36, from the transform domain back into real space using the inverse signal transform of the one used for compression at transformer 22. The output of this operation is the expanded data which very closely resembles the original data without the noise components.

The PMT was developed for application in compression of astronomical images, i.e. huge images with sparse round or disk-like features (such as stars etc.), some image distortions, and noise, as further described in "Image processing and data analysis: The Multiscale Approach", by J. L. Starck, F. Murtagh, and A. Bijaoui, Astronomical Data Analysis Software and Systems IV, ASP Conference Series, Vol. 77, pages 1–4, 1995, which is hereby incorporated by reference. The invention advantageously exploits characteristics of ORBS data and properties of the Pyramidal Median Transform (PMT) to permit discrimination between signal and noise.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of compressing data from an optical biomolecular sensor array, said data including signal information and noise, said method comprising:

transforming said data using a multiscale transform technique such that said data is represented as a plurality of transform coefficients each having a weight representative of the energy associated therewith;

determining which transform coefficients are associated with noise based on the weights of the respective transform coefficients;

extracting those transform coefficients associated with noise from said plurality of transform coefficients; and further processing the remaining transform coefficients.

2. The method of claim 1, wherein a transform coefficient with a corresponding weight that is one of below a first threshold and above a second threshold is determined to be a transform coefficient associated with noise.

3. The method of claim 2, wherein said first threshold is less than said second threshold.

4. The method of claim 1, wherein said further processing step comprises;

quantizing the remaining transform coefficients; and coding said quantized transform coefficients.

5. The method of claim 1, wherein said multiscale transform technique is the Pyramidal Median Transform.

6. The method of claim 4 further including expanding the compressed data such that resultant data is representative of said signal, comprising:

decoding said coded quantized transform coefficients; and transforming the decoded transform coefficients using the inverse of said multiscale transform technique.

7. The method of claim 6, wherein said multiscale transform technique is the Pyramidal Median Transform.

8. An apparatus for compressing data from an optical biomolecular sensor array, comprising:

a transformer having an input for receiving said data, which includes signal information and noise, said transformer adapted to transform said data using a multiscale transform technique such that said data is represented as a plurality of transform coefficients each having a weight representative of the energy associated therewith;

a determination device having an input coupled to said transformer for receiving said plurality of transform coefficients and adapted to determine which transform coefficients are associated with noise based on the weights of the respective transform coefficients, said determination device further adapted to extract from said plurality of transform coefficients those transform coefficients determined to be associated with noise; and an output coupled to said determination device to provide the remaining transform coefficients for further processing.

9. The apparatus of claim 8, wherein said determination device determines that a transform coefficient with a corresponding weight that is one of below a first threshold and above a second threshold is a transform coefficient associate with noise.

10. The apparatus of claim 9, wherein said first threshold is less than said second threshold.

11. The apparatus of claim 8 further including a quantization unit having an input couple to said output for receiving the remaining transform coefficients and adapted to quantize the remaining transform coefficients.

12. The apparatus of claim 11 further including a coding unit coupled to said quantization unit and adapted to code said quantized transform coefficients.

13. The apparatus of claim 12, wherein said coding unit codes said quantized transform to coefficients into a binary representation.

14. The apparatus of claim 8, wherein said multiscale transform technique is the Pyramidal Median Transform.

* * * * *